(12) United States Patent
Nho et al.

(10) Patent No.: US 10,665,857 B2
(45) Date of Patent: May 26, 2020

(54) POSITIVE ELECTRODE ACTIVE MATERIAL FOR SECONDARY BATTERY, AND METHOD OF PREPARING THE SAME

(71) Applicant: LG Chem, Ltd., Seoul (KR)

(72) Inventors: Jun Seok Nho, Daejeon (KR); Seung Beom Cho, Daejeon (KR); Hyun Ah Park, Daejeon (KR); Jun Seong Ahn, Daejeon (KR)

(73) Assignee: LG Chem, Ltd. (KR)

( * ) Notice: Subject to any disclaimer, the term of this patent is extended or adjusted under 35 U.S.C. 154(b) by 48 days.

(21) Appl. No.: 15/760,089

(22) PCT Filed: Feb. 28, 2017

(86) PCT No.: PCT/KR2017/002212
§ 371 (c)(1),
(2) Date: Mar. 14, 2018

(87) PCT Pub. No.: WO2017/150893
PCT Pub. Date: Sep. 8, 2017

(65) Prior Publication Data
US 2018/0261832 A1    Sep. 13, 2018

(30) Foreign Application Priority Data

Mar. 3, 2016 (KR) .................... 10-2016-0025626
Feb. 27, 2017 (KR) .................... 10-2017-0025656

(51) Int. Cl.
*H01M 4/36*    (2006.01)
*H01M 4/525*   (2010.01)
(Continued)

(52) U.S. Cl.
CPC ............. *H01M 4/366* (2013.01); *B01J 13/04* (2013.01); *H01M 4/131* (2013.01); *H01M 4/485* (2013.01);
(Continued)

(58) Field of Classification Search
CPC ...... H01M 4/366; H01M 4/525; H01M 4/505; H01M 2004/028; H01M 4/485
See application file for complete search history.

(56) References Cited

U.S. PATENT DOCUMENTS

2005/0042514 A1    2/2005  Sun et al.
2012/0280171 A1   11/2012  Belharouak et al.
(Continued)

FOREIGN PATENT DOCUMENTS

JP      2008-277307 A     11/2008
KR   10-2008-0087338 A    10/2008
(Continued)

OTHER PUBLICATIONS

International Search Report in PCT/KR2017/002212, dated Jun. 1, 2017, 2 pages.
(Continued)

*Primary Examiner* — Stewart A Fraser
(74) *Attorney, Agent, or Firm* — Lerner, David, Littenberg, Krumholz & Mentlik, LLP

(57) ABSTRACT

The present invention relates to a positive electrode active material for a lithium secondary battery and a method of preparing the same, and more particularly, to a positive electrode active material for a lithium secondary battery comprising a lithium-nickel-based transition metal oxide; and a coating layer formed on the lithium-nickel-based transition metal oxide, the coating layer comprising a metal oxalate compound, and a method of preparing the same.

11 Claims, 6 Drawing Sheets

(51) Int. Cl.
*H01M 4/62* (2006.01)
*H01M 10/052* (2010.01)
*H01M 4/131* (2010.01)
*H01M 4/485* (2010.01)
*H01M 4/505* (2010.01)
*B01J 13/04* (2006.01)
*H01M 10/0525* (2010.01)
*H01M 4/02* (2006.01)

(52) U.S. Cl.
CPC ........... *H01M 4/505* (2013.01); *H01M 4/525* (2013.01); *H01M 4/62* (2013.01); *H01M 4/628* (2013.01); *H01M 10/052* (2013.01); *H01M 10/0525* (2013.01); *H01M 2004/028* (2013.01)

(56) References Cited

U.S. PATENT DOCUMENTS

| | | | |
|---|---|---|---|
| 2014/0151598 A1 | 6/2014 | Belharouak et al. | |
| 2014/0315104 A1 | 10/2014 | Liu et al. | |
| 2014/0329141 A1* | 11/2014 | Onizuka | H01M 10/0525 429/199 |
| 2015/0147630 A1 | 5/2015 | Nakano et al. | |
| 2015/0221938 A1 | 8/2015 | Yamamoto et al. | |
| 2015/0228975 A1 | 8/2015 | Lee et al. | |
| 2015/0349307 A1 | 12/2015 | Dadheech et al. | |
| 2016/0013476 A1 | 1/2016 | Oh et al. | |
| 2016/0260965 A1* | 9/2016 | Wu | H01M 4/139 |
| 2017/0288206 A1 | 10/2017 | Lee et al. | |
| 2017/0324084 A1* | 11/2017 | Lee | H01M 4/366 |

FOREIGN PATENT DOCUMENTS

| | | |
|---|---|---|
| KR | 10-1372053 B | 3/2014 |
| KR | 10-2014-0103940 A | 8/2014 |
| KR | 10-2015-0037635 A | 4/2015 |

OTHER PUBLICATIONS

A.M.A. Hashem et al., Study of the surface modification of LiNi1/3Co1/3Mn1/3O2 cathode material for lithium ion battery, Journal of Power Sources, vol. 196, No. 20, (2011) pp. 8632-8637.

Extended European Search Report including Written Opinion for Application No. EP17760297.6 dated May 9, 2018.

* cited by examiner

POSITIVE ELECTRODE ACTIVE MATERIAL FOR SECONDARY BATTERY, AND METHOD OF PREPARING THE SAME

CROSS-REFERENCE TO RELATED APPLICATIONS

The present application is a national phase entry under 35 U.S.C. § 371 of International Application No. PCT/KR2017/002212 filed Feb. 28, 2017, published in Korean, which claims priority from Korean Patent Application Nos. 10-2016-0025626, filed Mar. 3, 2016 and 10-2017-0025656, filed Feb. 27, 2017, all of which are incorporated herein in their.

TECHNICAL FIELD

Technical Field

The present invention relates to a positive electrode active material and a method of preparing the same, and more particularly, to a positive electrode active material for a lithium secondary battery comprising a coating layer which can reduce the amount of a lithium compound remaining on a surface and suppress surface activation, and a method of preparing the same.

Background Art

As portable small electronic devices spread, development of new secondary batteries such as nickel hydrogen batteries or lithium secondary batteries is being actively performed. Among these secondary batteries, a lithium secondary battery uses carbon such as graphite or the like as a negative electrode active material, a lithium-comprising oxide as a positive electrode active material, and a non-aqueous solvent as an electrolyte solution. Since lithium used as the positive electrode active material is a metal having a high ionization tendency, the lithium enables high voltage generation and thus can realize a battery having a high energy density.

A lithium-including cobalt oxide ($LiCo_2$) having a layered structure is mainly used as the lithium-including oxide, and in addition to the lithium-including cobalt oxide, the use of a lithium-including manganese oxide such as $LiMnO_2$ having a layered crystal structure, $LiMn_2O_4$ having a spinel crystal structure, etc., and a lithium-including nickel oxide ($LiNiO_2$) are considered.

Especially, researches on a lithium-nickel-based positive electrode active material for high voltage capable of realizing a high capacity of 200 mAh/g or higher due to a high nickel content have recently started.

However, in the case of the lithium-nickel-based positive electrode active material, in spite that the sintering process is performed under an oxygen ambient, a large amount of lithium derivatives such as lithium carbonate ($Li_2CO_3$) and lithium hydroxide (LiOH) remain on a surface of the prepared positive electrode active material. Further, the lithium-nickel-based positive electrode active material is disadvantageous in that it is difficult to store for a long time period due to moisture easily adsorbed on the surface thereof.

Since lithium precursors remaining on the surface of the positive electrode active material, and moisture cause a gelation phenomenon to make it difficult to manufacture electrodes and accelerate surface fading of the positive electrode active material, the lithium precursors and moisture act as causes of deteriorating the battery performances.

To overcome the above-described disadvantages, a method in which a subsequent water washing process is performed has been proposed. However, the above-described method is disadvantageous in that the additional water washing process makes the manufacturing process complicated and increases the manufacturing costs as well as it is virtually impossible to wash large quantities of powder with water in a short time in the manufacturing scale. If the water washing process is prolonged, lithium and transition metal are eluted together from the inside as well as from the surface of the positive electrode active material, adversely affecting the characteristics of the battery.

Therefore, development of a manufacturing method of a positive electrode active material which can remove difficulties in manufacturing of a battery due to lithium and moisture remaining on the surface of the positive electrode active material and prevent the battery performance from being faded, is required.

DISCLOSURE OF THE INVENTION

Technical Problem

An aspect of the present invention provides a positive electrode active material for a lithium secondary battery, comprising a coating layer which can reduce the amount of a lithium derivative remaining on a surface thereof and suppress the surface activation.

Another aspect of the present invention provides a method of preparing a positive electrode active material comprising the coating layer.

Another aspect of the present invention provides a positive electrode which comprises the positive electrode active material, thereby capable of preventing performance from being degenerated.

Another aspect of the present invention provides a lithium secondary battery comprising the positive electrode.

Technical Solution

According to an aspect of the present invention, there is provided a positive electrode active material for a lithium secondary battery, the positive electrode active material comprising:

a lithium-nickel-based transition metal oxide; and a coating layer formed on the lithium-nickel-based transition metal oxide, wherein the coating layer comprises a metal oxalate compound.

The coating layer may further comprise boron.

According to another aspect of the present invention, there is provided a method of preparing the positive electrode active material for a lithium secondary battery.

Specifically, the method of preparing the positive electrode active material may comprise:

preparing a lithium-nickel-based transition metal oxide particle;

preparing an oxalic acid or a metal oxalate compound precursor;

mixing the lithium-nickel transition metal oxide particle and the oxalic acid or the metal oxalate compound precursor to form a mixture; and heat-treating the mixture to form a coating layer comprising a metal oxalate compound on a surface of the lithium-nickel-based transition metal oxide particle.

In the method, the oxalic acid or the metal oxalate compound precursor may be in a liquid state or in a powder state.

The heat-treating may be performed in a temperature range of 150° C. to 300° C.

The method may further comprise a boron precursor in mixing the lithium-nickel transition metal oxide particle and the oxalic acid or the metal oxalate compound precursor.

Also, a method (2) of preparing a positive electrode according to the present invention may comprise:

preparing a lithium-nickel-based transition metal oxide particle;

preparing an oxalic acid or a metal oxalate compound precursor;

preparing a boron precursor;

mixing the boron precursor and the lithium-nickel-based transition metal oxide particle to form a first mixture;

performing a first heat treatment of the first mixture to form a first coating layer comprising a boron compound on a surface of the lithium-nickel-based transition metal oxide particle;

mixing the lithium-nickel-based transition metal oxide particle having the first coating layer and the oxalic acid or the metal oxalate compound precursor to form a second mixture; and performing a second heat treatment of the second mixture to form a second coating layer on the first coating layer.

In the method, the first heat treatment may be performed in a temperature range of 150° C. to 450° C.

The second heat treatment may be performed in a temperature range of 150° C. to 300° C.

In the method, the boron precursor, the oxalic acid or the metal oxalate compound precursor may be in a liquid state or in a powder state.

According to another aspect of the present invention, there is provided a positive electrode comprising the positive electrode active material for a lithium secondary battery.

According to another aspect of the present invention, there is provided a lithium secondary battery comprising: the positive electrode and a negative electrode for the lithium secondary battery; a separator disposed between the positive electrode and the negative electrode, and an electrolyte solution.

Advantageous Effects

According to the present invention, since a coating layer comprising a metal oxalate compound is formed on a surface of a lithium-nickel-based transition metal oxide, the present invention can provide a positive electrode active material which can reduce the amount of lithium derivatives such as lithium carbonate and lithium hydroxide remaining on the surface as well as reduce the moisture adsorption amount during long term storage. Thus, a gelation phenomenon which occurs due to the remaining lithium derivatives and moisture can be prevented and generation of a gas due to a side reaction of caused by the remaining lithium derivatives and moisture and the electrolyte solution can be suppressed.

As a result, the positive electrode comprising the positive electrode active material of the present invention and the secondary battery comprising the same have superior capacity characteristics and can exhibit superior lifetime characteristics. Thus, the positive electrode comprising the positive electrode active material of the present invention and the secondary battery comprising the same can be easily applied to industries needing those, especially to industries such as electric vehicles needing high capacity and long lifetime characteristics.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
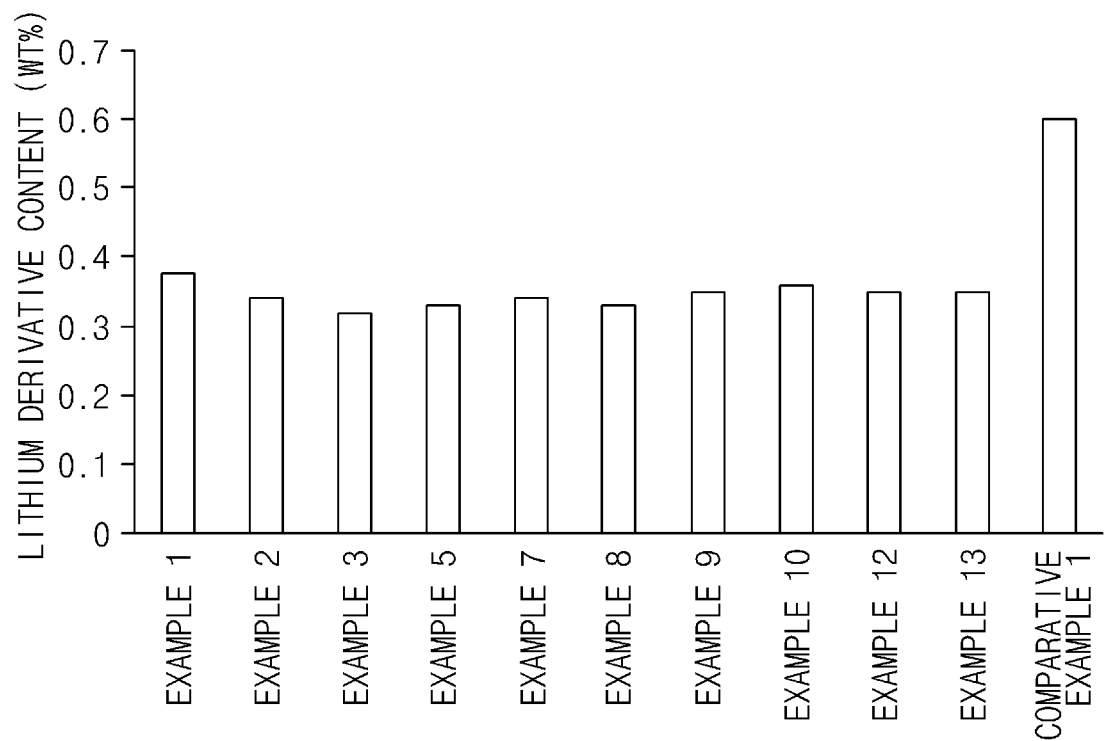
FIGS. 1 and 2 are graphs showing measurement results of amounts of lithium derivatives remaining on surfaces of positive electrode active materials according to Experimental Example 1 of the present invention.

Hereinafter, it will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Hereinafter, configurations associated with a positive electrode active material comprising a coating layer and a method of preparing the same according to an embodiment of the present invention will be described in detail.

Positive Electrode Active Material for Secondary Battery

First, an embodiment of the present invention provides a positive electrode active material for a lithium secondary battery, the positive electrode active material comprising:

a lithium-nickel-based transition metal oxide; and a coating layer formed on the lithium-nickel-based transition metal oxide, wherein the coating layer comprises a metal oxalate compound.

In the positive electrode active material for a lithium secondary, the lithium-nickel-based transition metal oxide may be represented by Formula 1 below:

   [Formula 1]

$Li_{1+a}Ni_{1-b-c}Mn_bCo_cM_dO_2$ in Formula 1, M is at least one metal element selected from the group consisting of Al, Mg, Fe, Cu, Zn, Cr, Ag, Ca, Na, K, In, Ga, Ge, V, Mo, Nb, Si, Ti and Zr, where $-0.1 \leq a < 0.2$, $0 \leq b < 1$, $0 \leq c < 1$, $0 \leq d \leq 0.2$.

At this time, nickel in the lithium-nickel-based transition metal oxide may be comprised in an amount of 40 mole % or more, preferably 40-95 mole % based on the total number of moles the transition metal except lithium in the lithium-nickel-based transition metal oxide.

The lithium-nickel-based transition metal oxide may be formed in a secondary particle having an agglomerated structure which comprises an agglomerate of fine particles.

An average particle size ($D_{50}$) of the lithium-nickel-based transition metal oxide may be 3 μm to 30 μm. If the average particle size of the lithium-nickel-based transition metal oxide is less than 3 μm, energy density and adhesion strength may be lowered due to use of an excessive amount of binder with respect to fine particles in the manufacturing of the electrode, and if the average particle size exceeds 30 μm, output characteristic is low and particle breakage may occur due to the rolling for the manufacturing of the electrode.

Also, in the positive electrode active material of the present invention, the metal oxalate compound comprised in the coating layer may comprise ions of at least one element selected from the group consisting of Li, B, Mg, Ca, V, Sr, Ba, Y, Ti, Zr, Nb, Ta, Cr, Mo, W, Mn, Fe, Co, Ir, Ni, Zn, Al, Ga, In, Si, Ge, Sn, La, Ce, Na, K, Rb, Cs, Fr, Sc, Fe, Ni, Cu, Ru, Rh, Pd, Ag, Cd, Sb, Hf, Ta, Re, Os, Pt, Au, Tl, Pb, Bi and Po, as cation, and comprised $C_2O_4^{2-}$ as anion.

In the positive electrode active material of the present invention, the coating layer may further comprise boron.

That is, the coating layer may comprise a single layer structure comprising a metal oxalate compound, or a single layer structure comprising an oxalate compound including metal and boron, or a multi-layer structure comprising a first coating layer comprising a boron compound and a second coating layer including an oxalate compound including metal and boron.

Specifically, the coating layer may comprise at least one selected from the group consisting of lithium oxalate compounds, lithium-boron oxalate compounds, magnesium oxalate compounds, lithium-magnesium oxalate compounds, magnesium-boron oxalate, lithium magnesium-boron oxalate, sodium oxalate compounds, lithium-sodium oxalate compounds, sodium-boron oxalate, lithium sodium-boron oxalate, aluminum oxalate compounds, lithium aluminum oxalate compounds, aluminum-boron oxalate, lithium aluminum-boron oxalate, calcium oxalate compounds, lithium-calcium oxalate compounds, calcium-boron oxalate, lithium calcium-boron oxalate, manganese oxalate compounds, lithium-manganese oxalate compounds, manganese-boron oxalate, lithium manganese-boron oxalate, zirconium oxalate compounds, lithium-zirconium oxalate compounds, zirconium-boron oxalate, and lithium zirconium-boron oxalate.

Also, the positive electrode active material of the present invention, the metal oxalate compound may be comprised in an amount of 0.01 wt % to 5 wt % based on the total weight of the positive electrode active material.

When the metal oxalate compound is comprised in the above-described range, a structurally stable coating layer may be formed on the surface of the lithium-nickel-based transition metal oxide. In conclusion, a composite positive electrode active material having superior thermal stability and capacity characteristic can be obtained. If the amount of the metal oxalate compound comprised in the coating layer exceeds 5 wt %, the thickness of the coating layer is increased by the excess amount of metal oxalate compound, so the thick coating layer may act as a resistance layer to greatly decrease the cell capacity. If the amount of the metal oxalate compound is less than 0.01 wt %, the coating layer is too thin, an effect of reducing the amount of the lithium derivative remaining on the surface of the positive electrode active material and an effect of reducing adsorption of moisture both of which are targeted in the present invention are insignificant and a decomposition preventing effect due to the electrolyte solution may be low.

In the positive electrode active material of the present invention, the coating layer may be formed on the entire surface or a portion of the lithium-nickel transition metal oxide and have a thickness of 5 nm to 1 μm. If the thickness is less than 5 nm, the coating layer is too thin, an effect of reducing the amount of the lithium derivative remaining on the surface of the positive electrode active material and an effect of reducing adsorption of moisture both of which are targeted in the present invention are insignificant and an electrolyte solution decomposition preventing effect may be low, and if the thickness is 1 μm or more, the coating layer increases the resistance and thus cell capacity may be decreased greatly.

Also, it is desirable that the average particle size ($D_{50}$) of the positive electrode active material comprising the coating layer of the present invention be in a range of 3 μm to 30 μm. If the average particle size is less than 3 μm, it is difficult to disperse the positive electrode active material in a slurry, or an agglomeration of the positive electrode active material in the electrode may be problematic, and if the average particle size exceeds 30 μm, particle breakage may be caused by the rolling for manufacturing of the electrode. Thus, since an unstabilized new surface comes into contact with the electrolyte solution and thus an effect of preventing an electrolyte solution decomposition reaction is insignificant, the lifetime of the battery may be reduced.

At this time, the average particle size ($D_{50}$) of the positive electrode active material may be measured by using a laser diffraction method. The laser diffraction method can measure the particle size from a sub-micron level to a few mm and can obtain results of high reproducibility and high resolution.

In the positive electrode active material of the present invention, lithium diffused from the core thereof exists in the form of a lithium derivative such as lithium carbonate ($Li_2CO_3$) or lithium hydroxide (LiOH) on the surface of the lithium-nickel-based transition metal oxide. Such lithium derivatives react with oxalic acid ions or oxalate groups which exist in an oxalic acid or a metal oxalate compound in a state dissolved or melted in the heat treatment to form strong metal-oxygen covalent bonds, thereby capable of forming a stable coating layer on the surface of the lithium-nickel-based transition metal oxide.

That is, the positive electrode active material of the present invention may reduce the amount of lithium derivative while the lithium and the lithium derivative existing on the surface of the lithium-nickel-based transition metal oxide are consumed to form the coating layer, and thus pH of the surface of the positive electrode active material is lowered to reduce the moisture adsorption amount during long term storage, thereby capable of preventing a gelation phenomenon of a slurry which may occur in the manufacturing of an electrode. Further, the coating layer is formed on the surface of the lithium-nickel-based transition metal oxide to block a direct contact of the lithium-nickel-based transition metal oxide with the electrolyte solution, thereby suppressing the surface activation and thus capable of providing an effect of suppressing the oxidation and side reaction due to the electrolyte solution.

In particular, since the positive electrode active material of the present invention further comprises a boron compound, a more stable coating layer having a single layer or multi-layer structure is formed, thereby capable of realizing a more improved long lifetime effect.

In case that such a positive electrode active material of the present invention is comprised, since it is possible to suppress the side reaction of the lithium derivative and moisture remaining on the surface of the positive electrode of a secondary battery with the electrolyte solution, a secondary battery having improved stability and cycle characteristic can be manufactured.

Method of Preparing Positive Electrode Active Material for Lithium Secondary Battery An embodiment of the present invention also provides a method of preparing a positive electrode active material for a lithium secondary battery.

Herein, the method of preparing the positive electrode active material for a secondary battery according to the present invention may comprise one or more methods as follows.

Specifically, a method (1) of preparing a positive electrode active material for a lithium secondary battery according to an embodiment of the present invention comprises:

preparing a lithium-nickel-based transition metal oxide particle;

preparing an oxalic acid or a metal oxalate compound precursor;

mixing the lithium-nickel-based transition metal oxide particle and the oxalic acid or the metal oxalate compound precursor to form a mixture; and heat-treating the mixture to form a coating layer comprising a metal oxalate compound on a surface of the lithium-nickel-based transition metal oxide particle.

In the method (1) of preparing a positive electrode active material according to the present invention, the lithium-nickel-based transition metal oxide particle may be prepared by a method well known in the art.

Specifically, the lithium-nickel-based transition metal oxide particle may be prepared by mixing a transition metal precursor and a lithium raw material and sintering the mixture.

Also, in the method (1) of preparing a positive electrode active material according to the present invention, the oxalic acid or the metal oxalate compound precursor may be in a liquid phase or powder state.

When the oxalic acid or the metal oxalate compound precursor is in a liquid state, the oxalic acid or the metal oxalate compound precursor may be prepared by dissolving an oxalic acid or a metal-oxalate compound in a solvent.

The solvent is particularly limited as long as it is an organic or inorganic solvent capable of dissolving the oxalic acid or the metal-oxalate compound, and a representative example of the solvent may comprise water, alcohols such as ethanol, methanol, isopropyl alcohol, ethylene glycol and butylene glycol, and an organic or inorganic solvent such as benzene, toluene, dichloromethane, chloroform, dichloroethane, trichloroethane, tetrachloroethane, dichloroethylene, trichloroethylene, tetrachloroethylene chlorobenzene, ortho-dichlorobenzene, ethylether, dioxane, tetrahydrobutane, acetone, methylethylketone (MEK), methylbutylketone (MBK), methylisobutylketone (MIBK), ethyleneglycolmonomethylether, ethyleneglycolmonoethylether, ethyleneglycolmonoethylether, or ethylene glycol monobuthyl ether.

When the oxalic acid or the metal oxalate compound precursor is in a liquid state, it is desirable that the concentration of a liquid state coating solution be 0.01 wt % to 50 wt %. If the concentration of the coating solution is less than 0.01%, long drying time and high energy consumption are problematic, and if the concentration of the coating solution exceeds 50 wt %, deterioration in coating uniformity is problematic.

Also, when the oxalic acid or the metal oxalate compound precursor is in a powder state, the oxalic acid or the metal oxalate compound precursor may be prepared by placing an oxalic acid or a metal oxalate compound into a mortar and pulverizing.

In the method (1) of preparing a positive electrode active material according to the present invention, the oxalic acid or the metal-oxalate compound precursor may be comprised in an amount of about 0.01 wt % to 5 wt % based on the total weight of the lithium-nickel-based transition metal oxide mixed.

If the oxalic acid content or the metal oxalate compound precursor content is less than 0.01 wt % based on the total weight of the lithium-nickel-based transition metal oxide mixed, an effect in which a lithium derivative content is reduced in the surface of the lithium-nickel-based transition metal oxide particle is not sufficient, and if the amount exceeds 5 wt % based on the total weight of the lithium-nickel-based transition metal oxide mixed, decreases in battery capacity and output characteristics are problematic.

Also, in the method (1) of preparing a positive electrode active material according to the present invention, when the oxalic acid or the metal oxalate compound precursor is in a liquid state, the method (1) may further comprise removing a solvent constituting the liquid solution so as to dry the oxalic acid or the metal oxalate compound precursor in a liquid state prior to the heat-treating.

removing the solvent is preferably performed by heating the solvent to a temperature above a boiling point of the solvent such that the solvent is easily removed, and is preferably performed at 130° C. or higher, specifically, at a temperature ranging from 130° C. to 200° C.

Further, the method (1) of preparing a positive electrode active material may further comprise a heat treatment after removing the solvent in order to form an oxalate compound-comprising coating layer and to impart a moisture-removing effect.

The heat treatment may be performed in a temperature range of 150° C. to 300° C. If the heat treatment is performed at a temperature lower than 150° C., a reaction for forming a coating layer comprising lithium and the metal oxalate compound or a moisture-removing effect is not sufficient, and if the heat treatment is performed at a temperature higher than 350° C., it is disadvantageous in that lithium and the metal oxalate compound are decomposed.

Furthermore, the method (1) of preparing a positive electrode active material may further comprise placing the oxalic acid or the metal oxalate compound precursor in a mortar and pulverizing or sieving in some cases after the heat treatment.

Preferably, the method (1) of preparing a positive electrode active material may further comprise adding a boron precursor capable of obtaining a long lifetime effect in mixing the lithium-nickel-based transition metal oxide particle and the oxalic acid or the metal oxalate compound precursor.

A representative example of the boron precursor may comprise at least one selected from the group consisting of boric acid, boron oxide, lithium borate, magnesium borate, sodium borate, potassium borate, and calcium borate.

When the boron precursor is comprised, the coating effect of a metal boron oxalate compound may be enhanced and thus the long lifetime effect may be further realized. It is desirable that the boron precursor be comprised in an amount of 0.01 wt % to 10 wt % based on the total weight of the lithium transition metal oxide. If the boron precursor content is less than the above-described range, the effect due to the boron precursor may not be realized, and if the amount exceeds the above-described range, an excessive coating layer is formed, so that a decrease in the capacity of the positive electrode material and a resistance increase are problematic.

As described above, a method (1-1) of preparing a positive electrode active material according to the present invention comprise:

preparing a lithium-nickel-based transition metal oxide particle;

dissolving an oxalic acid or a metal-oxalate compound in a solvent to prepare a coating solution;

mixing the lithium-nickel-based transition oxide particle in the coating solution and heating to remove a solvent; and heat-treating the mixture to form a coating layer comprising a metal oxalate compound on a surface of the lithium-nickel-based transition metal oxide particle after removing the solvent.

Also, a method (1-2) of preparing a positive electrode according to the present invention may comprise:

preparing a lithium-nickel-based transition metal oxide particle;

preparing an oxalic acid powder or a metal oxalate powder;

mixing the lithium-nickel-based transition metal oxide particle with the oxalic acid powder or the metal oxalate powder to form a mixture; and heat-treating the mixture to form a coating layer comprising a metal oxalate compound on a surface of the lithium-nickel-based transition metal oxide particle.

Also, a method (1-3) of preparing a positive electrode according to the present invention may comprise:

preparing a lithium-nickel-based transition metal oxide particle;

preparing an oxalic acid powder or a metal oxalate powder;

preparing a boron precursor;

mixing the lithium-nickel-based transition metal oxide particle with the boron precursor and the oxalic acid powder or the metal oxalate powder to form a mixture; and heat-treating the mixture to form a coating layer comprising an oxalate compound comprising a metal and boron on a surface of the lithium-nickel-based transition metal oxide particle.

Also, a method (2) of preparing a positive electrode for a lithium secondary battery according to an embodiment of the present invention may comprise:

preparing a lithium-nickel-based transition metal oxide particle;

preparing an oxalic acid or a metal oxalate compound precursor;

preparing a boron precursor;

mixing the boron precursor and the lithium-nickel-based transition metal oxide particle to form a first mixture;

performing a first heat treatment of the first mixture to form a first coating layer comprising a boron compound on a surface of the lithium-nickel-based transition metal oxide particle;

mixing the lithium-nickel-based transition metal oxide particle having the first coating layer and the oxalic acid or the metal oxalate compound precursor to form a second mixture; and performing a second heat treatment of the second mixture to form a second coating layer on the first coating layer.

In the method, the boron precursor, the oxalic acid or the metal oxalate compound precursor may be in a liquid state or in a powder state, and it is desirable that the boron precursor be in a powder state.

The oxalic acid or the metal oxalate compound precursor may be comprised in an amount of 0.01 wt % to 5 wt % based on the total weight of the lithium-nickel-based transition metal oxide.

If the oxalic acid content or the metal oxalate compound precursor content is less than 0.01 wt % based on the total weight of the lithium-nickel-based transition metal oxide mixed, an effect in which a lithium derivative content is reduced in the surface of the lithium-nickel-based transition metal oxide particle is not sufficient, and if the amount exceeds 5 wt % based on the total weight of the lithium-nickel-based transition metal oxide mixed, decreases in battery capacity and output characteristics are problematic.

Also, when the oxalic acid or the metal oxalate compound precursor is in a liquid state, the method may further comprise removing the solvent prior to the second heat treatment.

Removing the solvent is preferably performed by heating the solvent to a temperature above a boiling point of the solvent such that the solvent is easily removed, and is preferably performed at 130° C. or higher, specifically, at a temperature ranging from 130° C. to 200° C.

A representative example of the boron precursor may comprise at least one selected from the group consisting of boric acid, boron oxide, lithium borate, magnesium borate, sodium borate, potassium borate, and calcium borate.

It is desirable that the boron precursor be comprised in an amount of 0.01 wt % to 10 wt % based on the total weight of the lithium transition metal oxide. When the boron precursor is comprised, the coating effect of the metal boron oxalate compound may be further enhanced. If the boron precursor content is less than the above-described range, the effect due to the boron precursor may not be realized, and if the amount exceeds the above-described range, an excessive coating layer is formed, so that a decrease in the capacity of the positive electrode material and a resistance increase are problematic.

Meanwhile, the second coating layer may comprise an oxalate compound including metal and boron, and in this case, the boron comprised in the second coating layer may be boron which has been diffused from the first coating layer to the second coating layer during the formation of the second coating layer.

Also, in mixing the lithium-nickel-based transition metal oxide particle and the oxalic acid or the metal oxalate compound precursor to form a second mixture, the boron precursor capable of obtaining a long-term life enhancing effect may be further comprised.

As described above, according to the present invention, a positive electrode active material having an increased capacity of the positive electrode material and improved long-term lifetime characteristic and cycle characteristic may be manufactured by forming a coating layer having a double-layered structure, for example, by forming a first coating layer comprising boron and then forming a second coating layer comprising an oxalate compound including metal and boron on the surface of the first coating layer.

At this time, in the method (2) of preparing a positive electrode active material, performing a first heat treatment of a first particle on which the first coating layer comprising the boron compound is formed, at a temperature ranging from 150° C. to 450° C. in order to increase the capacity of the positive electrode material and to impart an effect of enhancing cycle characteristic.

If the heat treatment is performed at a temperature less than 150° C., a reaction for forming a boron compound coating layer or a moisture removing effect is insignificant and if the heat treatment is performed at a temperature higher than 450° C., it is disadvantageous in that a boron compound is decomposed.

Moreover, the method (2) of preparing a positive electrode active material may further comprise a second heat treatment after removing the solvent in order to form an oxalate compound-comprising coating layer and to impart a moisture-removing effect.

The second heat treatment may be performed in a temperature range of 150° C. to 300° C. If the heat treatment is performed at a temperature lower than 150° C., a reaction for forming a coating layer comprising lithium and the metal oxalate compound or diffusion of boron into the second coating layer may not occur and a moisture-removing effect may not be sufficient, and if the heat treatment is performed at a temperature higher than 350° C., it is disadvantageous in that lithium and the metal oxalate compound are decomposed.

Positive Electrode for Lithium Secondary Battery

According to an embodiment of the present invention, there is provided a positive electrode comprising the positive electrode active material for a lithium secondary battery.

The positive electrode according to an embodiment of the present invention may be manufactured by applying a positive electrode active material slurry comprising the positive electrode active material on a positive electrode current collector and performing drying and rolling.

At this time, the material of the positive electrode current collector is also not particularly limited as long as it has conductivity while not causing a chemical change in the battery. Examples of the material of the positive electrode current collector may comprise stainless steel, aluminum, nickel, titanium, plastic carbon, or aluminum or stainless steel of which surface is treated with C, Ni, Ti, Ag, or the like.

Meanwhile, the current collector may generally have a thickness ranging from 3 μm to 500 μm, and adhesion of the positive electrode active material to the current collector may be increased by forming fine irregularities on a surface of the current collector. For example, the current collector may be used in various forms such as sheet, foil, net, porous body, foam, nonwoven fabric, etc.

Optionally, the positive electrode active material of the present invention may further comprise at least one selected from conducting agent, binder and filler.

The conducting agent is not particularly limited as long as it has conductivity while not causing a chemical change in the battery. Examples of the conducting agent may comprise: graphite such as natural graphite, synthetic graphite, or the like; carbon-based material such as carbon black, acetylene black, Ketjen black, channel black, furnace black, lamp black, thermal black, or the like; conductive fiber such as carbon fiber, metal fiber, or the like; metal powder such as carbon fluoride powder, aluminum powder, nickel powder, or the like; conductive whiskey such as zinc oxide, potassium titanate, or the like; conductive metal oxide such as titanium oxide or the like; and conductive material such as polyphenylene derivative or the like.

The conducting agent may be generally comprised in an amount of 1 wt % to 30 wt % based on the total weight of the mixture comprising the positive electrode active material.

The binder is not particularly limited as long as it is a component for assisting the bonding between an active material and a conducting agent and the bonding between an active material and a current collector. Examples of the binder may comprise polyvinylidene fluoride, polyvinyl alcohol, carboxymethylcellulose (CMC), starch, hydroxypropylcellulose, recycled cellulose, polyvinylpyrrolidone, tetrafluoroethylene, polyethylene, polypropylene, ethylene-propylene-diene monomer (EPDM), sulfonated EPDM, styrene-butylene rubber, fluorine rubber, various copolymers, and the like.

Generally, the binder may be comprised in an amount of 1 wt % to 30 wt % based on the total weight of the mixture comprising a positive electrode active material.

The filler is a component for suppressing the expansion of an electrode, and is selectively used. The filler is not particularly limited as long as it is a fibrous material while not causing a chemical change in the battery. Examples of the filer may comprise: olefin polymers such as polyethylene, polypropylene and the like; and fibrous materials such as glass fiber, carbon fiber and the like.

The applying may be performed by a method publicly known in the art, for example, a method in which the positive electrode active material slurry is distributed on an upper surface of the positive electrode current collector and then is uniformly dispersed by using a doctor blade. In addition to the above method, the applying may be performed by a method such as die casting, comma coating, screen printing or the like.

The drying is not particularly limited but may be performed in a vacuum oven of 50° C. to 200° C. within one day.

Lithium Secondary Battery

Further, according to an embodiment of the present invention, there is provided a lithium secondary battery comprising a positive electrode, a negative electrode, a separator disposed between the positive electrode and the negative electrode, and an electrolyte.

The negative electrode may be formed by, but not particularly limited to, applying a negative electrode active material slurry comprising a negative electrode active material on an upper surface of one side of a negative electrode current collector and then performing drying, and the negative electrode active material slurry may comprise components such as conducting agent, binder, filler and the like as described above if needed in addition to the negative electrode active material.

The material of the negative electrode current collector is not particularly limited as long as the material has high conductivity while not causing a chemical change in the battery. Examples of the material of the negative electrode current collector may comprise copper, stainless steel, aluminum, nickel, titanium, plastic carbon, copper or stainless steel of which surface is treated with carbon, nickel, titanium, silver or the like, and an aluminum-cadmium (Al—Cd) alloy.

Generally, the current collector may have a thickness ranging from 3 μm to 500 μm, and as in the positive electrode current collector, adhesion of the negative electrode active material to the current collector may be increased by forming fine irregularities on a surface of the current collector. For example, the current collector may be used in various forms such as sheet, foil, net, porous body, foam, nonwoven fabric, etc.

Examples of the negative electrode active material may comprise: carbon and graphite materials such as natural graphite, synthetic graphite, expansion graphite, carbon fiber, hard carbon, carbon black, carbon nanotube, fullerene, activated carbon and the like; metal capable of forming an alloy with lithium, such as Al, Si, Sn, Ag, Bi, Mg, Zn, In, Ge, Pb, Pd, Pt, Ti or the like and compounds comprising such metal elements; metal and compound thereof and a composite material of carbon and graphite material; lithium-comprising nitrides, etc. Among these, a carbon-based active material, a silicon-based active material, a tin-based active material, or a silicon-carbon-based active material is more preferable and may be used alone or in combinations of two or more.

The conducting agent, binder, filler and the like used in the negative electrode may be the same as or be comprised in those used in the manufacturing of the positive electrode.

Also, the separator is disposed between the positive electrode and the negative electrode and may be made of an insulating thin film having high ion permeability and mechanical strength. Generally, the separator may have a pore diameter of 0.01 μm to 10 μm and a thickness of 5 μm to 300 μm.

As the separator, a sheet or nonwoven fabric made of an olefin polymer such as polypropylene having chemical resistance and hydrophobicity, glass fiber or polyethylene may be used.

When a solid electrolyte such as a polymer or the like, is used as an electrolyte, the solid electrolyte may serve both as a separator and an electrolyte.

The lithium salt-comprising nonaqueous electrolyte comprises an electrolyte and a lithium salt. As the electrolyte, a nonaqueous organic solvent, an organic solid electrolyte or the like may be used.

As the nonaqueous organic solvent, a nonprotonic organic solvent, such as N-methyl-2-pyrrolidinone, propylene carbonate, ethylene carbonate, butylene carbonate, dimethyl carbonate, diethyl carbonate, gamma-butyrolactone, 1,2-dimethoxyethane, tetrahydroxyfuran, 2-methyl tetrahydrofuran, dimethylsulfoxide, 1,3-dioxolan, formamide, dimethylformamide, dioxolane, acetonitrile, nitromethane, methyl formate, methyl acetate, triester phosphate, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, ethyl propionate or the like, may be used.

As the organic solid electrolyte, a polyethylene derivative, a polyethylene oxide derivative, a polypropylene oxide derivative, a phosphoric ester polymer, poly agitation lysine, polyester sulfide, polyvinyl alcohol, polyvinylidene fluoride, a polymer having an ionic dissociation group or the like may be used.

The lithium salt is a material which is easily dissolved in the nonaqueous electrolyte. Examples of the lithium salt may comprise LiCl, LiBr, LiI, LiClO$_4$, LiBF$_4$, LiF$_{10}$C$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chloroboran lithium, lower aliphatic lithium carboxylate, lithium 4-phenylborate, imide and the like Further, in order to improve the charge-discharge characteristics, flame retardancy and the like of the battery, pyridine, triethylphosphite, triethanolamine, cyclic ether, ethylene diamine, n-glyme, hexatriamide phosphate, nitrobenzene derivative, sulfur, quinoneimine dye, N-substituted oxazolidinone, N,N-substituted imidazolidine, ethyleneglycol dialkyl ether, ammonium salt, pyrrole, 2-methoxy ethanol, aluminum trichloride or the like may be added to the electrolyte. According to circumstances, the electrolyte may further comprise a solvent comprising halogen, such as carbon tetrachloride, ethylene trifluoride or the like in order to provide flame resistance, and may further comprise carbon dioxide gas in order to improve high-temperature storage characteristics.

A shape of the lithium secondary battery according to the present invention is not particularly limited, and for example, a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module comprising a plurality of battery cells. Preferred examples of the medium and large sized device may be an electric vehicle, a hybrid electric vehicle, a plug-in hybrid electric vehicle, or a power storage system, but the medium and large sized device is not limited thereto.

Hereinafter, the present invention will be described in detail according to specific examples. The invention may, however, be embodied in many different forms and should not be construed as being limited to the embodiments set forth herein. These embodiments are provided so that this disclosure will more fully convey the concept of the invention to those skilled in the art.

EXAMPLE

Preparation Example 1

5 g of an oxalic acid (C$_2$H$_2$O$_4$) was dissolved in 95 g of distilled water and stirred to prepare an oxalic acid solution having a concentration of 3%.

Preparation Example 2

A magnesium oxalate solution was prepared by the same method as that in Preparation Example 1 except that 5 g of magnesium oxalate (MgC$_2$O$_4$) was used instead of the oxalic acid in Preparation Example 1.

Preparation Example 3

The oxalic acid (C$_2$H$_2$O$_4$) was placed in a mortar and pulverized to prepare an oxalic acid powder.

Preparation Example 4

Magnesium oxalate (MgC$_2$O$_4$) was placed in a mortar and pulverized to prepare a magnesium oxalate powder.

Preparation Example 5

A boric acid (H$_3$BO$_3$) was placed in a mortar and pulverized to prepare a boric acid powder.

<Preparation of Lithium-Nickel-based Transition Metal Oxide Particle>

Preparation Example 6

89.46 g of LiOH(H$_2$O) as a lithium precursor and 200 g of Ni$_{0.6}$Mn$_{0.2}$Co$_{0.2}$(OH)$_2$ which is an average diameter of 10 μm as a transition metal precursor were mixed for 1 minute at a speed of 18,000 rpm which was rpm of a central portion of an experimental mixer to prepare a precursor.

The prepared precursor was placed in an alumina crucible and sintered for 6 hours at about 860° C. in the air ambient. The cake obtained after sintering was pulverized and classified using a 400 mesh sieve (TIyer standard screen scale in the US) to obtain a lithium-nickel transition metal oxide, LiNi$_{0.6}$Mn$_{0.2}$Co$_{0.2}$O$_2$ (average diameter (D$_{50}$): 10 μm).

Preparation Example 7

89.46 g of LiOH(H$_2$O) as a lithium precursor and 200 g of Ni$_{0.8}$Mn$_{0.1}$Co$_{0.1}$(OH)$_2$ which is an average diameter of 10

μm as a transition metal precursor and were mixed for 1 minute at a speed of 18,000 rpm which was rpm of a central portion of an experimental mixer to prepare a precursor.

The prepared precursor was placed in an alumina crucible and sintered for 6 hours at about 800° C. in an oxygen ($O_2$) ambient. The cake obtained after sintering was pulverized and classified using a 400 mesh sieve (TIyer standard screen scale in the US) to obtain a lithium-nickel transition metal oxide, $LiNi_{0.8}Mn_{0.1}Co_{0.1}O_2$ (Average diameter ($D_{50}$): 10 μm).

Positive Electrode Active Material and Manufacturing of Secondary Battery

Example 1

As shown in Table 1 below, 2 g of the oxalic acid solution which is a concentration of 5% in Preparation Example 1 and 50 g of the lithium-nickel transition metal oxide ($LiNi_{0.6}Mn_{0.2}Co_{0.2}O_2$) of Preparation Example 6 were mixed, dried for 6 hours at 150° C., heat-treated for 6 hours at 250° C., pulverized in a mortar and sieved to prepare a positive electrode active material (average diameter ($D_{50}$): 10 μm) having a coating layer comprising a lithium oxalate compound on a surface of the lithium-nickel transition metal oxide ($LiNi_{0.6}Mn_{0.2}Co_{0.2}O_2$).

The positive electrode active material, carbon black as a conducting agent, and PVDF as a binder were mixed at a weight ratio of 96:2:2 to prepare a positive electrode slurry, and then the slurry was coated on an aluminum (Al) foil, rolled and dried to prepare a positive electrode for a secondary battery.

A secondary battery was manufactured by using the positive electrode and lithium as a negative electrode active material, disposing a separator of porous polyethylene between the positive electrode and the negative electrode, and injecting an electrolyte. The electrolyte was prepared by dissolving lithiumhexafluorophosphate ($LiPF_6$) in an organic solvent composed of ethylenecarbonate (EC)/dimethylcarbonate (DEC)/ethylmethylcarbonate (EMC) (Mixing volume ratio of EC/DEC/EMC=3/4/3) to be 1.0 M.

Example 2

As shown in Table 1 below, 4 g of the oxalic acid solution which is a concentration of 5% in Preparation Example 1 and 50 g of the lithium-nickel transition metal oxide ($LiNi_{0.6}Mn_{0.2}Co_{0.2}O_2$) in Preparation Example 6 were mixed, dried for 6 hours at 150° C., heat-treated for 6 hours at 250° C., pulverized in a mortar and sieved to prepare a positive electrode active material (average diameter ($D_{50}$): 10 μm) having a coating layer comprising a lithium oxalate compound on a surface of the lithium-nickel transition metal oxide ($LiNi_{0.6}Mn_{0.2}Co_{0.2}O_2$).

The positive electrode active material, carbon black as a conducting agent, and PVDF as a binder were mixed at a weight ratio of 96:2:2 to prepare a positive electrode slurry, and then the slurry was coated on an aluminum (Al) foil, rolled and dried to prepare a positive electrode for a secondary battery.

A secondary battery was manufactured by using the positive electrode and lithium as a negative electrode active material, disposing a separator of porous polyethylene between the positive electrode and the negative electrode, and injecting an electrolyte. The electrolyte was prepared by dissolving lithiumhexafluorophosphate ($LiPF_6$) in an organic solvent composed of ethylenecarbonate (EC)/dimethylcarbonate (DEC)/ethylmethylcarbonate (EMC) (Mixing volume ratio of EC/DEC/EMC=3/4/3) to be 1.0 M.

Example 3

As shown in Table 1 below, 8 g of the oxalic acid solution which is a concentration of 5% in Preparation Example 1 and 50 g of the lithium-nickel transition metal oxide ($LiNi_{0.6}Mn_{0.2}Co_{0.2}O_2$) in Preparation Example 6 were mixed, dried for 6 hours at 150° C., heat-treated for 6 hours at 250° C., pulverized in a mortar and sieved to prepare a positive electrode active material (average diameter ($D_{50}$): 10 μm) having a coating layer comprising a lithium oxalate compound on a surface of the lithium-nickel transition metal oxide ($LiNi_{0.6}Mn_{0.2}Co_{0.2}O_2$).

The positive electrode active material, carbon black as a conducting agent, and PVDF as a binder were mixed at a weight ratio of 96:2:2 to prepare a positive electrode slurry, and then the slurry was coated on an aluminum (Al) foil, rolled and dried to prepare a positive electrode for a secondary battery.

A secondary battery was manufactured by using the positive electrode and lithium as a negative electrode active material, disposing a separator of porous polyethylene between the positive electrode and the negative electrode, and injecting an electrolyte. The electrolyte was prepared by dissolving lithiumhexafluorophosphate ($LiPF_6$) in an organic solvent composed of ethylenecarbonate (EC)/dimethylcarbonate (DEC)/ethylmethylcarbonate (EMC) (Mixing volume ratio of EC/DEC/EMC=3/4/3) to be 1.0 M.

Example 4

A positive electrode active material (average diameter ($D_{50}$): 10 μm) having a coating layer comprising a lithium oxalate compound on a surface of a lithium-nickel transition metal oxide ($LiNi_{0.8}Mn_{0.1}Co_{0.1}O_2$) was prepared by a method which is the same as that in Example 2 above except that the lithium-nickel transition metal oxide ($LiNi_{0.8}Mn_{0.1}Co_{0.1}O_2$) of Preparation Example 7 was used instead of the lithium-nickel transition metal oxide ($LiNi_{0.6}Mn_{0.2}Co_{0.2}O_2$) of Preparation Example 6 as shown in Table 1 below.

The positive electrode active material, carbon black as a conducting agent, and PVDF as a binder were mixed at a weight ratio of 96:2:2 to prepare a positive electrode slurry, and then the slurry was coated on an aluminum (Al) foil, rolled and dried to prepare a positive electrode for a secondary battery.

A secondary battery was manufactured by using the positive electrode and lithium as a negative electrode active material, disposing a separator of porous polyethylene between the positive electrode and the negative electrode, and injecting an electrolyte. The electrolyte was prepared by dissolving lithiumhexafluorophosphate ($LiPF_6$) in an organic solvent composed of ethylenecarbonate (EC)/dimethylcarbonate (DEC)/ethylmethylcarbonate (EMC) (Mixing volume ratio of EC/DEC/EMC=3/4/3) to be 1.0 M.

Example 5

A positive electrode active material (average diameter ($D_{50}$): 10 μm) having a coating layer comprising a lithium-magnesium oxalate compound was prepared by a method which is the same as that in Example 2 above except that the magnesium oxalate solution having a concentration of 5% of Preparation Example 2 was used instead of the oxalic acid solution of Preparation Example 1 as shown in Table 1 below.

The positive electrode active material, carbon black as a conducting agent, and PVDF as a binder were mixed at a weight ratio of 96:2:2 to prepare a positive electrode slurry, and then the slurry was coated on an aluminum (Al) foil, rolled and dried to prepare a positive electrode for a secondary battery.

A secondary battery was manufactured by using the positive electrode and lithium as a negative electrode active material, disposing a separator of porous polyethylene between the positive electrode and the negative electrode, and injecting an electrolyte. The electrolyte was prepared by dissolving lithiumhexafluorophosphate ($LiPF_6$) in an organic solvent composed of ethylenecarbonate (EC)/dimethylcarbonate (DEC)/ethylmethylcarbonate (EMC) (Mixing volume ratio of EC/DEC/EMC=3/4/3) to be 1.0 M.

Example 6

A positive electrode active material (average diameter ($D_{50}$): 10 μm) having a coating layer comprising a lithium-magnesium oxalate compound was prepared by a method which is the same as that in Example 5 above except that the lithium-nickel transition metal oxide ($LiNi_{0.8}Mn_{0.1}Co_{0.1}O_2$) of Preparation Example 7 was used instead of the lithium-nickel transition metal oxide ($LiNi_{0.6}Mn_{0.2}Co_{0.2}O_2$) of Preparation Example 6 as shown in Table 1 below.

The positive electrode active material, carbon black as a conducting agent, and PVDF as a binder were mixed at a weight ratio of 96:2:2 to prepare a positive electrode slurry, and then the slurry was coated on an aluminum (Al) foil, rolled and dried to prepare a positive electrode for a secondary battery.

A secondary battery was manufactured by using the positive electrode and lithium as a negative electrode active material, disposing a separator of porous polyethylene between the positive electrode and the negative electrode, and injecting an electrolyte. The electrolyte was prepared by dissolving lithiumhexafluorophosphate ($LiPF_6$) having a concentration of 1.0 M in an organic solvent composed of ethylenecarbonate (EC)/dimethylcarbonate (DEC)/ethylmethylcarbonate (EMC) (Mixing volume ratio of EC/DEC/EMC=3/4/3).

Example 7

As shown in Table 1 below, 0.2 g of the oxalic acid powder in Preparation Example 3 and the 50 g of lithium-nickel transition metal oxide ($LiNi_{0.6}Mn_{0.2}Co_{0.2}O_2$) in Preparation Example 6 were mixed, heat-treated for 6 hours at 250° C., pulverized in a mortar and sieved to prepare a positive electrode active material (average diameter ($D_{50}$): 10 μm) having a coating layer comprising a lithium oxalate compound on a surface of the lithium-nickel transition metal oxide ($LiNi_{0.6}Mn_{0.2}Co_{0.2}O_2$).

The positive electrode active material, carbon black as a conducting agent, and PVDF as a binder were mixed at a weight ratio of 96:2:2 to prepare a positive electrode slurry, and then the slurry was coated on an aluminum (Al) foil, rolled and dried to prepare a positive electrode for a secondary battery.

A secondary battery was manufactured by using the positive electrode and lithium as a negative electrode active material, disposing a separator of porous polyethylene between the positive electrode and the negative electrode, and injecting an electrolyte. The electrolyte was prepared by dissolving lithiumhexafluorophosphate ($LiPF_6$) in an organic solvent composed of ethylenecarbonate (EC)/dimethylcarbonate (DEC)/ethylmethylcarbonate (EMC) (Mixing volume ratio of EC/DEC/EMC=3/4/3) to be 1.0 M.

Example 8

A positive electrode active material (average diameter ($D_{50}$): 10 μm) having a coating layer comprising a lithium-magnesium oxalate compound was prepared by a method which is the same as that in Example 7 above except that the magnesium oxalate powder of Preparation Example 4 was used instead of the oxalic acid powder of Preparation Example 3 as shown in Table 1 below.

The positive electrode active material, carbon black as a conducting agent, and PVDF as a binder were mixed at a weight ratio of 96:2:2 to prepare a positive electrode slurry, and then the slurry was coated on an aluminum (Al) foil, rolled and dried to prepare a positive electrode for a secondary battery.

A secondary battery was manufactured by using the positive electrode and lithium as a negative electrode active material, disposing a separator of porous polyethylene between the positive electrode and the negative electrode, and injecting an electrolyte. The electrolyte was prepared by dissolving lithiumhexafluorophosphate ($LiPF_6$) in an organic solvent composed of ethylenecarbonate (EC)/dimethylcarbonate (DEC)/ethylmethylcarbonate (EMC) (Mixing volume ratio of EC/DEC/EMC=3/4/3) to be 1.0 M.

Example 9

A positive electrode active material (average diameter ($D_{50}$): 10 μm) having a coating layer comprising a lithium-boron oxalate compound was prepared by a method which is the same as that in Example 7 above except that 1.15 g of the boric acid powder of Preparation Example 5 was further mixed as shown in Table 1 below.

The positive electrode active material, carbon black as a conducting agent, and PVDF as a binder were mixed at a weight ratio of 96:2:2 to prepare a positive electrode slurry, and then the slurry was coated on an aluminum (Al) foil, rolled and dried to prepare a positive electrode for a secondary battery.

A secondary battery was manufactured by using the positive electrode and lithium as a negative electrode active material, disposing a separator of porous polyethylene between the positive electrode and the negative electrode, and injecting an electrolyte. The electrolyte was prepared by dissolving lithiumhexafluorophosphate ($LiPF_6$) in an organic solvent composed of ethylenecarbonate (EC)/dimethylcarbonate (DEC)/ethylmethylcarbonate (EMC) (Mixing volume ratio of EC/DEC/EMC=3/4/3) to be 1.0 M.

Example 10

A positive electrode active material (average diameter ($D_{50}$): 10 μm) having a coating layer comprising a lithium-boron oxalate compound was prepared by a method which is the same as that in Example 9 above except that 2.3 g of the boric acid powder of Preparation Example 5 was further mixed as shown in Table 1 below.

The positive electrode active material, carbon black as a conducting agent, and PVDF as a binder were mixed at a weight ratio of 96:2:2 to prepare a positive electrode slurry, and then the slurry was coated on an aluminum (Al) foil, rolled and dried to prepare a positive electrode for a secondary battery.

A secondary battery was manufactured by using the positive electrode and lithium as a negative electrode active material, disposing a separator of porous polyethylene between the positive electrode and the negative electrode, and injecting an electrolyte. The electrolyte was prepared by dissolving lithiumhexafluorophosphate (LiPF$_6$) in an organic solvent composed of ethylenecarbonate (EC)/dimethylcarbonate (DEC)/ethylmethylcarbonate (EMC) (Mixing volume ratio of EC/DEC/EMC=3/4/3) to be 1.0 M.

Example 11

A positive electrode active material (average diameter (D$_{50}$): 10 μm) having a coating layer comprising a lithium-boron oxalate compound was prepared by a method which is the same as that in Example 10 above except that the lithium-nickel transition metal oxide (LiNi$_{0.8}$Mn$_{0.1}$Co$_{0.1}$O$_2$) of Preparation Example 7 was used instead of the lithium-nickel transition metal oxide (LiNi$_{0.6}$Mn$_{0.2}$Co$_{0.2}$O$_2$) of Preparation Example 6 as shown in Table 1 below.

The positive electrode active material, carbon black as a conducting agent, and PVDF as a binder were mixed at a weight ratio of 96:2:2 to prepare a positive electrode slurry, and then the slurry was coated on an aluminum (Al) foil, rolled and dried to prepare a positive electrode for a secondary battery.

A secondary battery was manufactured by using the positive electrode and lithium as a negative electrode active material, disposing a separator of porous polyethylene between the positive electrode and the negative electrode, and injecting an electrolyte. The electrolyte was prepared by dissolving lithiumhexafluorophosphate (LiPF$_6$) in an organic solvent composed of ethylenecarbonate (EC)/dimethylcarbonate (DEC)/ethylmethylcarbonate (EMC) (Mixing volume ratio of EC/DEC/EMC=3/4/3) to be 1.0 M.

Example 12

A positive electrode active material (average diameter (D$_{50}$): 10 μm) having a coating layer comprising a lithium-magnesium boron oxalate compound was prepared by a method which is the same as that in Example 9 above except that the magnesium oxalate of Preparation Example 4 was used instead of the oxalic acid as shown in Table 1 below.

The positive electrode active material, carbon black as a conducting agent, and PVDF as a binder were mixed at a weight ratio of 96:2:2 to prepare a positive electrode slurry, and then the slurry was coated on an aluminum (Al) foil, rolled and dried to prepare a positive electrode for a secondary battery.

A secondary battery was manufactured by using the positive electrode and lithium as a negative electrode active material, disposing a separator of porous polyethylene between the positive electrode and the negative electrode, and injecting an electrolyte. The electrolyte was prepared by dissolving lithiumhexafluorophosphate (LiPF$_6$) in an organic solvent composed of ethylenecarbonate (EC)/dimethylcarbonate (DEC)/ethylmethylcarbonate (EMC) (Mixing volume ratio of EC/DEC/EMC=3/4/3) to be 1.0 M.

Example 13

As shown in Table 1 below, a first particle comprising a coating layer comprising a lithium-boron compound was prepared by mixing the boric acid powder 1.15 g of Preparation Example 5 and the lithium-nickel transition metal oxide (LiNi$_{0.6}$Mn$_{0.2}$Co$_{0.2}$O$_2$) 50 g, performing a first heat treatment of the mixture for 6 hours at 350° C., pulverizing and sieving the heat-treated mixture.

A positive electrode active material (average diameter (D$_{50}$): 10 μm) having a two-layered coating layer comprising a lithium-boron oxalate compound was prepared by mixing the first particle and an 0.2 g of oxalic acid powder, performing a secondary heat treatment of the mixture for 6 hours at 250° C., and pulverizing and sieving the heat-treated mixture.

The positive electrode active material, carbon black as a conducting agent, and PVDF as a binder were mixed at a weight ratio of 96:2:2 to prepare a positive electrode slurry, and then the slurry was coated on an aluminum (Al) foil, rolled and dried to prepare a positive electrode for a secondary battery.

A secondary battery was manufactured by using the positive electrode and lithium as a negative electrode active material, disposing a separator of porous polyethylene between the positive electrode and the negative electrode, and injecting an electrolyte. The electrolyte was prepared by dissolving lithiumhexafluorophosphate (LiPF$_6$) in an organic solvent composed of ethylenecarbonate (EC)/dimethylcarbonate (DEC)/ethylmethylcarbonate (EMC) (Mixing volume ratio of EC/DEC/EMC=3/4/3) to be 1.0 M.

Example 14

As shown in Table 1 below, a first particle comprising a first coating layer comprising a lithium-boron compound was prepared by mixing 2.3 g of the boric acid powder of Preparation Example 5 and 50 g of the lithium-nickel transition metal oxide (LiNi$_{0.8}$Mn$_{0.1}$Co$_{0.1}$O$_2$), performing a first heat treatment of the mixture for 6 hours at 350° C., and pulverizing and sieving the heat-treated mixture.

A positive electrode active material (average diameter (D$_{50}$): 10 μm) having a two-layered coating layer comprising a lithium-boron oxalate compound was prepared by mixing the first particle and 0.2 g of an oxalic acid powder, performing a second heat treatment of the mixture for 6 hours at 250° C., and pulverizing and sieving the heat-treated mixture.

The positive electrode active material, carbon black as a conducting agent, and PVDF as a binder were mixed at a weight ratio of 96:2:2 to prepare a positive electrode slurry, and then the slurry was coated on an aluminum (Al) foil, rolled and dried to prepare a positive electrode for a secondary battery.

A secondary battery was manufactured by using the positive electrode and lithium as a negative electrode active material, disposing a separator of porous polyethylene between the positive electrode and the negative electrode, and injecting an electrolyte. The electrolyte was prepared by dissolving lithiumhexafluorophosphate (LiPF$_6$) having a concentration of 1.0 M in an organic solvent composed of ethylenecarbonate (EC)/dimethylcarbonate (DEC)/ethylmethylcarbonate (EMC) (Mixing volume ratio of EC/DEC/EMC=3/4/3).

Comparative Example 1

As shown in Table 1 below, the lithium transition metal oxide of Preparation Example 6 was used as a positive electrode active material.

The positive electrode active material, carbon black as a conducting agent, and PVDF as a binder were mixed at a weight ratio of 96:2:2 to prepare a positive electrode slurry, and then the slurry was coated on an aluminum (Al) foil, rolled and dried to prepare a positive electrode for a secondary battery.

A secondary battery was manufactured by using the positive electrode and lithium as a negative electrode active material, disposing a separator of porous polyethylene between the positive electrode and the negative electrode, and injecting an electrolyte. The electrolyte was prepared by dissolving lithiumhexafluorophosphate (LiPF$_6$) in an organic solvent composed of ethylenecarbonate (EC)/dimethylcarbonate (DEC)/ethylmethylcarbonate (EMC) (Mixing volume ratio of EC/DEC/EMC=3/4/3) to be 1.0 M.

Comparative Example 2

As shown in Table 1 below, the lithium transition metal oxide of Preparation Example 7 was used as a positive electrode active material.

The positive electrode active material, carbon black as a conducting agent, and PVDF as a binder were mixed at a weight ratio of 96:2:2 to prepare a positive electrode slurry, and then the slurry was coated on an aluminum (Al) foil, rolled and dried to prepare a positive electrode for a secondary battery.

A secondary battery was manufactured by using the positive electrode and lithium as a negative electrode active material, disposing a separator of porous polyethylene between the positive electrode and the negative electrode, and injecting an electrolyte. The electrolyte was prepared by dissolving lithiumhexafluorophosphate (LiPF$_6$) in an organic solvent composed of ethylenecarbonate (EC)/dimethylcarbonate (DEC)/ethylmethylcarbonate (EMC) (Mixing volume ratio of EC/DEC/EMC=3/4/3) to be 1.0 M.

Reference Example 1

As shown in Table 1 below, 0.05 g of the oxalic acid solution having a concentration of 5% in Preparation Example and 50 g of the lithium-nickel transition metal oxide (LiNi$_{0.6}$Mn$_{0.2}$Co$_{0.2}$O$_2$) of Preparation Example 6 were mixed, dried for 6 hours at 150° C., heat-treated for 6 hours at 250° C., pulverized in a mortar and sieved to prepare a positive electrode active material (average diameter (D$_{50}$): 10 μm) having a coating layer comprising a lithium oxalate compound on a surface of the lithium-nickel transition metal oxide (LiNi$_{0.6}$Mn$_{0.2}$Co$_{0.2}$O$_2$).

The positive electrode active material, carbon black as a conducting agent, and PVDF as a binder were mixed at a weight ratio of 96:2:2 to prepare a positive electrode slurry, and then the slurry was coated on an aluminum (Al) foil, rolled and dried to prepare a positive electrode for a secondary battery.

A secondary battery was manufactured by using the positive electrode and lithium as a negative electrode active material, disposing a separator of porous polyethylene between the positive electrode and the negative electrode, and injecting an electrolyte. The electrolyte was prepared by dissolving lithiumhexafluorophosphate (LiPF$_6$) in an organic solvent composed of ethylenecarbonate (EC)/dimethylcarbonate (DEC)/ethylmethylcarbonate (EMC) (Mixing volume ratio of EC/DEC/EMC=3/4/3) to be 1.0 M.

Reference Example 2

As shown in Table 1 below, 60 g of the oxalic acid solution having a concentration of 5% in Preparation Example 1 and 50 g the lithium-nickel transition metal oxide (LiNi$_{0.6}$Mn$_{0.2}$Co$_{0.2}$O$_2$) of Preparation Example 6 were mixed to obtain a mixture, and then the mixture was dried for 6 hours at 150° C., heat-treated for 6 hours at 250° C., pulverized in a mortar and sieved to prepare a positive electrode active material (average diameter (D$_{50}$): 10 μm) having a coating layer comprising a lithium oxalate compound on a surface of the lithium-nickel transition metal oxide (LiNi$_{0.6}$Mn$_{0.2}$Co$_{0.2}$O$_2$).

The positive electrode active material, carbon black as a conducting agent, and PVDF as a binder were mixed at a weight ratio of 96:2:2 to prepare a positive electrode slurry, and then the slurry was coated on an aluminum (Al) foil, rolled and dried to prepare a positive electrode for a secondary battery.

A secondary battery was manufactured by using the positive electrode and lithium as a negative electrode active material, disposing a separator of porous polyethylene between the positive electrode and the negative electrode, and injecting an electrolyte. The electrolyte was prepared by dissolving lithiumhexafluorophosphate (LiPF$_6$) having a concentration of 1.0 M in an organic solvent composed of ethylenecarbonate (EC)/dimethylcarbonate (DEC)/ethylmethylcarbonate (EMC) (Mixing volume ratio of EC/DEC/EMC=3/4/3).

TABLE 1

| Item | Lithium Transition Metal Oxide | | Oxalic Acid | | Magnesium Oxalate | | Boric Acid | Preparation Method |
| --- | --- | --- | --- | --- | --- | --- | --- | --- |
| | LiNi$_{0.6}$Mn$_{0.2}$Co$_{0.2}$O$_2$ | LiNi$_{0.8}$Mn$_{0.1}$Co$_{0.1}$O$_2$ | Solution (5%) | Powder | Solution (5%) | Powder | Powder | |
| Example 1 | 50 g | — | 2 g | — | — | — | — | 1-1 |
| Example 2 | 50 g | — | 4 g | — | — | — | — | 1-1 |
| Example 3 | 50 g | — | 8 g | — | — | — | — | 1-1 |
| Example 4 | — | 50 g | 4 g | — | — | — | — | 1-1 |
| Example 5 | 50 g | — | — | — | 4 g | — | — | 1-1 |
| Example 6 | — | 50 g | — | — | 4 g | — | — | 1-1 |
| Example 7 | 50 g | — | — | — | 0.2 g | — | — | 1-2 |
| Example 8 | 50 g | — | — | — | — | 0.2 g | — | 1-2 |
| Example 9 | 50 g | — | — | — | 0.2 g | — | 1.15 g | 1-3 |
| Example 10 | 50 g | — | — | — | 0.2 g | — | 2.3 g | 1-3 |
| Example 11 | — | — | — | — | 0.2 g | — | 2.3 g | 1-3 |
| Example 12 | 50 g | — | — | — | — | 0.2 g | 1.15 g | 1-3 |
| Example 13 | 50 g | — | — | — | 0.2 g | — | 1.15 g | 2 |
| Example 14 | — | 50 g | — | — | 0.2 g | — | 2.3 g | 2 |

TABLE 1-continued

| Item | Lithium Transition Metal Oxide | | Oxalic Acid | | Magnesium Oxalate | | Boric | Preparation |
| --- | --- | --- | --- | --- | --- | --- | --- | --- |
| | $LiNi_{0.6}Mn_{0.2}Co_{0.2}O_2$ | $LiNi_{0.8}Mn_{0.1}Co_{0.1}O_2$ | Solution (5%) | Powder | Solution (5%) | Powder | Acid Powder | Method |
| Comparative Example 1 | ○ | — | — | — | — | — | — | — |
| Comparative Example 2 | — | ○ | — | — | — | — | — | — |
| Reference Example 1 | 50 g | — | 0.05 g | — | — | — | — | 1-1 |
| Reference Example 2 | 50 g | — | 60 g | — | — | — | — | 1-1 |

Comparative Example 3

5 g of a citric acid ($C_6H_8O_7$) was dissolved in 100 g of distilled water and stirred to prepare a citric acid solution having a concentration of 5%.

4 g the citric acid solution and 50 g of the lithium-nickel transition metal oxide ($LiNi_{0.8}Mn_{0.1}Co_{0.1}O_2$) of Preparation Example 7 were mixed, dried for 6 hours at 150° C., heat-treated for 6 hours at 250° C., pulverized in a mortar and sieved to prepare a positive electrode active material (average diameter ($D_{50}$): 10 μm) having a coating layer comprising a lithium citrate compound on a surface of the lithium-nickel transition metal oxide ($LiNi_{0.8}Mn_{0.1}Co_{0.1}O_2$).

The positive electrode active material, carbon black as a conducting agent, and PVDF as a binder were mixed at a weight ratio of 96:2:2 to prepare a positive electrode slurry, and then the slurry was coated on an aluminum (Al) foil, rolled and dried to prepare a positive electrode for a secondary battery.

A secondary battery was manufactured by using the positive electrode and lithium as a negative electrode active material, disposing a separator of porous polyethylene between the positive electrode and the negative electrode, and injecting an electrolyte. The electrolyte was prepared by dissolving lithiumhexafluorophosphate ($LiPF_6$) in an organic solvent composed of ethylenecarbonate (EC)/dimethylcarbonate (DEC)/ethylmethylcarbonate (EMC) (Mixing volume ratio of EC/DEC/EMC=3/4/3) to be 1.0 M.

EXPERIMENTAL EXAMPLE

Experimental Example 1. Evaluation of Amount of Lithium Derivative Remaining on Surface 5 g of the positive electrode active materials of Examples 1 to 14 and Comparative Examples 2 and 3 was placed in a beaker comprising 100 ml of distilled water and stirred at a speed of 200 rpm for 5 minutes to dissolve lithium remaining on the surface. Then, the positive electrode active materials were removed from the lithium-dissolved solution by using a filter having an average pore size of 0.5 μm to 5 μm.

The lithium content in the solution was measured by titrating the lithium derivative which remained on the surface which removed from the positive electrode active materials, with a 1N HCl solution.

The lithium content in the solution was measured by an automatic titrator. A first inflection point (EP1) at which the pH rapidly changes from 7 to 9 and an end point (FP) at which the pH reaches 5 were measured, and the content of $Li_2CO_3$ and the content of LiOH are calculated by the following equation.

Amount (%) of $Li_2CO_3$: (FP-EP1)×0.1×0.001×(Mw (73.89)/5 of $Li_2CO_3$)×100

Amount (%) of LiOH: (2×EP1-FP)×0.1×0.001×(Mw (23.94)/5 of LiOH)×100

Figure 2:
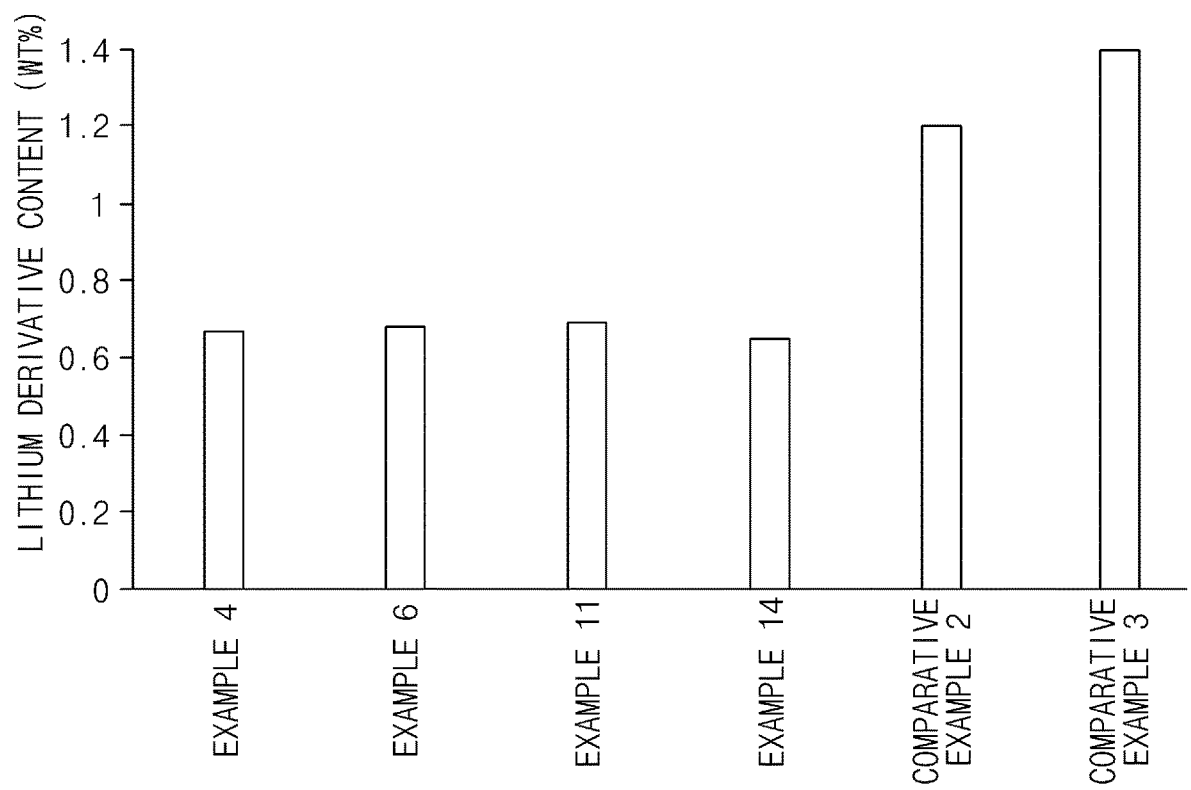

The calculated amounts of $Li_2CO_2$ and LiOH were summed to measure the lithium derivative content remaining on the final surface, the lithium derivative content was converted into wt %, and the results are shown in FIGS. 1 and 2.

At this time, FIG. 1 is a graph showing amounts of lithium derivatives remaining on surfaces of positive electrode active materials prepared using the lithium-nickel-based transition metal oxide ($LiNi_{0.6}Mn_{0.2}Co_{0.2}O_2$) of Preparation Example 6 and FIG. 2 is a graph showing amounts of lithium derivatives remaining on surfaces of positive electrode active materials prepared using the lithium-nickel-based transition metal oxide ($LiNi_{0.8}Mn_{0.1}Co_{0.1}O_2$) of Preparation Example 7.

First, it could be seen from FIG. 1 that the amount of the lithium derivative remaining on the surface of the positive electrode active material of Comparative Example 1 before a coating layer was formed was 0.6 wt % and the amounts of the lithium derivatives remaining on the surfaces of the positive electrode active materials of Examples 1 to 3, Example 5, Example 7 to 10, Example 12, and Example 13 of the present invention comprising a coating layer were all decreased to 0.4 wt % or less.

Also, it could be seen from FIG. 2 that the amount of the lithium derivative remaining on the surface of the positive electrode active material of Comparative Example 2 on which a coating layer was not formed was 1.2 wt % (high) and the amounts of the lithium derivatives remaining on the surfaces of the positive electrode active materials of Example 4, Example 6, Example 11, and Example 14 of the present invention comprising a coating layer were all decreased to 0.7 wt % or less.

However, it could be seen that the amount of the lithium derivative remaining on the surface of the positive electrode active material of Comparative Example 5 having a coating layer comprising a metal citrate was increased to 1.4 wt %.

Accordingly, it can be seen that the positive electrode active material comprising a coating layer comprising a metal oxalate compound according to the present invention reduces the amount of the lithium derivative remaining on the surface thereof.

Experimental Example 2

A cell capacity test was performed with respect to secondary batteries of Examples 1 to 14, Comparative Examples 1 to 3, and Reference Examples 1 and 2. Specifically, cells were charged at 25° C. at a constant current (CC) of 0.1 C to 4.35 V, then at a constant voltage (CV) of 4.35 V to a charging current of 0.05 C in one-time charging. Then, the cells were left for 20 minutes and then were discharged at a constant current of 0.1 C to 3.0 V and then to a discharging current of 0.05 C to measure the discharging capacity at one time. The results are shown in FIGS. 3 and 4.

Figure 3:
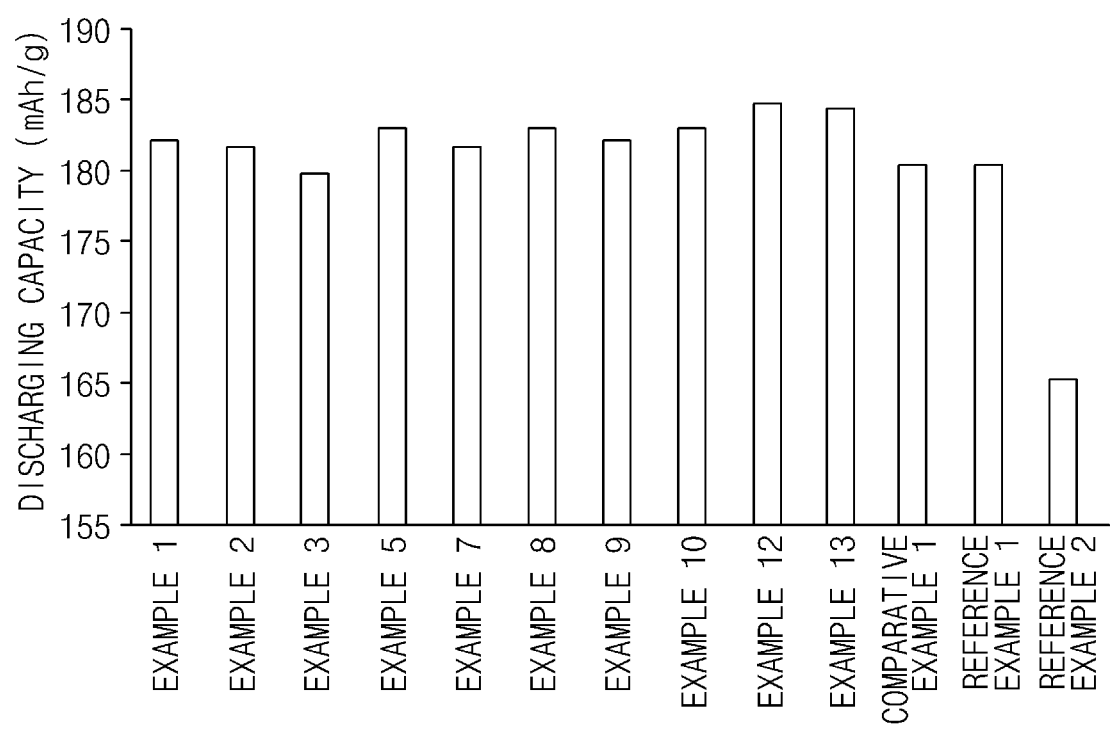
FIGS. 3 and 4 are graphs showing capacity test results of lithium secondary batteries according to Experimental Example 2 of the present invention.
Figure 4:
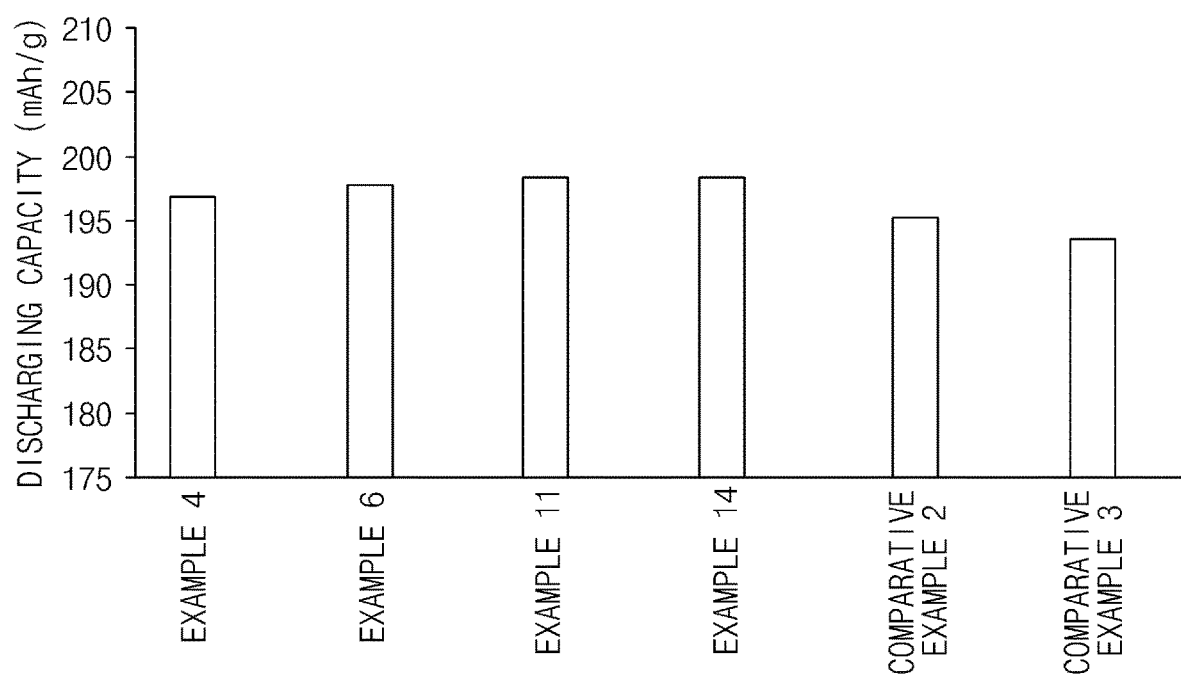

At this time, FIG. 3 is a graph showing discharging capacities of secondary batteries employing positive electrode active materials prepared using the lithium-nickel-based transition metal oxide ($LiNi_{0.6}Mn_{0.2}Co_{0.2}O_2$) of Preparation Example 6 and FIG. 4 is a graph showing discharging capacities of secondary batteries employing positive electrode active materials prepared using the lithium-nickel-based transition metal oxide ($LiNi_{0.8}Mn_{0.1}Co_{0.1}O_2$) of Preparation Example 7.

First, it could be seen from FIG. 3 that the secondary battery of Comparative Example 1 and the secondary battery of Reference Example 1 employing the positive electrode active material comprising a coating layer having a low metal oxalate content had a discharging capacity of 180 mAh/g. Especially, it could be seen that the secondary battery of Reference Example 2 employing the positive electrode active material comprising a coating layer having an excessive amount of metal oxalate compound had a discharging capacity of 165 mAh/g (lowest discharging capacity). On the other hand, it could be seen that all the secondary batteries of Examples 1 to 3, Example 5, Examples 7 to 10, Example 12, and Example 13 employing the positive electrode active materials of the present invention had improved discharging capacities of 180 mAh/g.

Also, it could be seen from FIG. 4 that the secondary batteries of Example 4, Example 6, Example 11, and Example 14 had improved discharging capacities higher than that of Comparative Example 2 employing a positive electrode active material on which a coating layer was not formed. On the other hand, it could be seen that the discharging capacity of the secondary battery of Comparative Example 3 having a coating layer comprising lithium citrate was decreased compared to the discharging capacity before the coating layer was formed.

Experimental Example 3

A cycle life test was performed with respect to secondary batteries of Examples 1 to 14, Comparative Examples 1 to 3, and Reference Examples 1 and 2. Specifically, cells were charged at 25° C. at a constant current (CC) of 1 C to 4.35 V, then at a constant voltage (CV) of 4.35 V to a charging current of 0.05 C in one-time charging. Then, the cells were left for 20 minutes and then were discharged at a constant current of 2 C to 3.0 V and then to a discharging current of 0.05 C. The charging and discharging were repeated in a cycle of 1 to 50 times, and the results obtained therefrom are shown in FIGS. 5 and 6.

Figure 5:
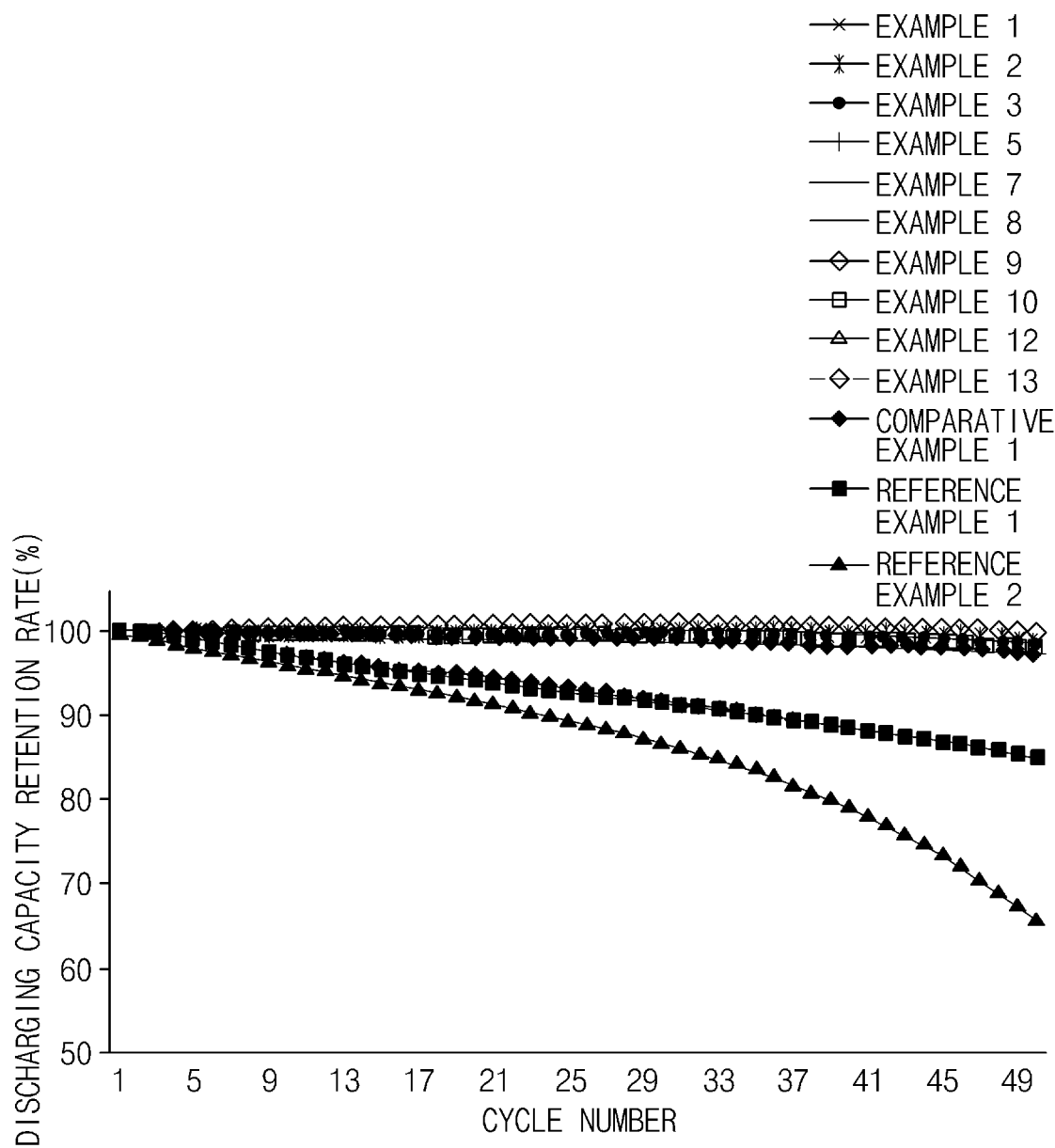
FIGS. 5 and 6 are graphs showing cycle lifetime characteristic results of lithium secondary batteries according to Experimental Example 3 of the present invention.
Figure 6:
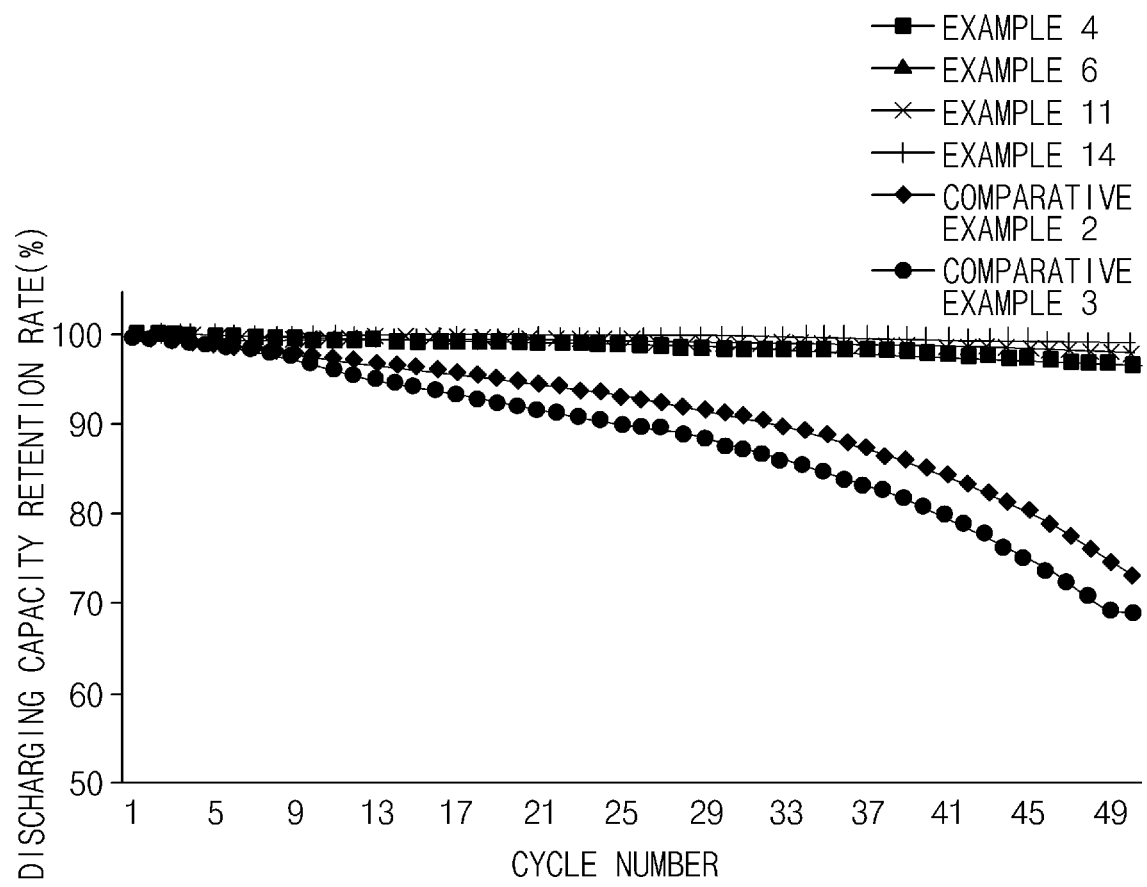

At this time, FIG. 5 is a graph showing cycle life characteristics (discharging capacity retention rate) of secondary batteries employing positive electrode active materials prepared using the lithium-nickel-based transition metal oxide ($LiNi_{0.6}Mn_{0.2}Co_{0.2}O_2$) of Preparation Example 6 and FIG. 6 is a graph showing cycle life characteristics (discharging capacity retention rate) of secondary batteries employing positive electrode active materials prepared using the lithium-nickel-based transition metal oxide ($LiNi_{0.8}Mn_{0.1}Co_{0.1}O_2$) of Preparation Example 7.

First, it could be seen from FIG. 5 that the secondary battery of Comparative Example 1 employing a positive electrode active material on which a coating layer was not formed, the secondary battery of Reference Example 1 employing a positive electrode active material comprising a coating layer having a low metal oxalate content, and the secondary battery of Reference Example 2 employing a positive electrode active material comprising a coating layer having an excessive of metal oxalate compound had cycle life which was abruptly decreased from tenth cycle, whereas the secondary batteries of Examples 1 to 3, Example 5, Examples 7 to 10, Example 12, and Example 13 of the present invention had improved cycle life.

Also, it could be seen from FIG. 6 that the secondary batteries of Example 4, Example 6, Example 11, and Example 14 of the present invention had improved cycle life characteristic higher than that of Comparative Example 2 employing a positive electrode active material on which a coating layer was not formed. On the other hand, it could be seen that the discharging capacity of the secondary battery of Comparative Example 3 having a coating layer comprising lithium citrate was worse than the cycle life characteristic before coating.

The invention claimed is:

1. A positive electrode active material for a lithium secondary battery, the positive electrode active material comprising:
   a lithium-nickel-based transition metal oxide; and
   a coating layer formed on the lithium-nickel-based transition metal oxide,
   wherein the lithium-nickel-based transition metal oxide has a lithium derivative, including at least one of a lithium carbonate ($Li_2CO_3$) or a lithium hydroxide (LiOH), on the surface of the lithium-nickel-based transition metal oxide,
   wherein the lithium derivative reacts with an oxalate compound to form the coating layer, the coating layer comprising a lithium-containing metal oxalate compound.

2. The positive electrode active material for a lithium secondary battery of claim 1, wherein the lithium-nickel-based transition metal oxide is represented by Formula 1 below:

$$Li_{1+a}Ni_{1-b-c}Mn_bCo_cM_dO_2 \quad \text{[Formula 1]}$$

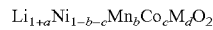

in Formula 1, M is at least one metal element selected from the group consisting of Al, Mg, Fe, Cu, Zn, Cr, Ag, Ca, Na, K, In, Ga, Ge, V, Mo, Nb, Si, Ti and Zr, where $-0.1 \leq a < 0.2$, $0 \leq b < 1$, $0 \leq c < 1$, $0 \leq d \leq 0.2$.

3. The positive electrode active material for a lithium secondary battery of claim 1, wherein nickel in the lithium-nickel-based transition metal oxide is comprised in an amount of 40 mole % or more based on the total number of moles of the transition metal except lithium in the lithium-nickel-based transition metal oxide.

4. The positive electrode active material for a lithium secondary battery of claim 1, wherein the metal oxalate compound comprises ion of at least one element selected from the group consisting of Li, B, Mg, Ca, V, Sr, Ba, Y, Ti, Zr, Nb, Ta, Cr, Mo, W, Mn, Fe, Co, Ir, Ni, Zn, Al, Ga, In, Si, Ge, Sn, La, Ce, Na, K, Rb, Cs, Fr, Sc, Fe, Ni, Cu, Ru, Rh, Pd, Ag, Cd, Sb, Hf, Ta, Re, Os, Pt, Au, Tl, Pb, Bi and Po, as cation, and comprises $C_2O_4^{2-}$ as anion.

5. The positive electrode active material for a lithium secondary battery of claim 1, wherein the coating layer further comprises boron.

6. The positive electrode active material for a lithium secondary battery of claim 1, wherein the coating layer comprises at least one selected from the group consisting of a lithium oxalate compound, a lithium-boron oxalate compound, a magnesium oxalate compound, a lithium-magnesium oxalate compound, magnesium-boron oxalate, lithium magnesium-boron oxalate, a sodium oxalate compound, a lithium-sodium oxalate compound, sodium-boron oxalate, lithium sodium-boron oxalate, an aluminum oxalate compound, a lithium aluminum oxalate compound, aluminum-boron oxalate, lithium aluminum-boron oxalate, a calcium oxalate compound, a lithium-calcium oxalate compound, calcium-boron oxalate, lithium calcium-boron oxalate, a manganese oxalate compound, a lithium-manganese oxalate compound, manganese-boron oxalate, lithium manganese-boron oxalate, a zirconium oxalate compound, a lithium-zirconium oxalate compound, zirconium-boron oxalate, and lithium zirconium-boron oxalate.

7. The positive electrode active material for a lithium secondary battery of claim 1, wherein the coating layer comprises a single layer structure comprising a metal oxalate compound; a single layer structure comprising an oxalate compound including metal and boron; or a multi-layer structure comprising a first coating layer comprising a boron compound and a second coating layer comprising an oxalate compound including metal and boron.

8. The positive electrode active material for a lithium secondary battery of claim 1, wherein the metal oxalate compound is comprised in an amount of 0.01 wt % to 5 wt % based on the total weight of the positive electrode active material.

9. The positive electrode active material for a lithium secondary battery of claim 1, wherein the coating layer has a thickness of 5 nm to 1 µm.

10. A positive electrode for a lithium secondary battery, the positive electrode comprising the positive electrode active material of claim 1.

11. A lithium secondary battery comprising: a positive electrode for a lithium secondary battery of claim 10; a negative electrode; a separator disposed between the positive electrode and the negative electrode, and an electrolyte.

* * * * *